United States Patent
Inokuma (10) Patent No.: US 11,159,117 B2
(45) Date of Patent: Oct. 26, 2021

(54) ROTARY ELECTRICAL MACHINE CONTROL DEVICE AND CONTROL SYSTEM

(71) Applicant: DENSO CORPORATION, Kariya (JP)

(72) Inventor: Kenji Inokuma, Kariya (JP)

(73) Assignee: DENSO CORPORATION, Kariya (JP)

( * ) Notice: Subject to any disclaimer, the term of this patent is extended or adjusted under 35 U.S.C. 154(b) by 130 days.

(21) Appl. No.: 16/665,008

(22) Filed: Oct. 28, 2019

(65) Prior Publication Data

US 2020/0059191 A1  Feb. 20, 2020

Related U.S. Application Data

(63) Continuation of application No. PCT/JP2018/012885, filed on Mar. 28, 2018.

(30) Foreign Application Priority Data

Apr. 27, 2017 (JP) .............................. JP2017-088191

(51) Int. Cl.
*H02P 29/024* (2016.01)
*B60L 3/00* (2019.01)
*B60L 50/64* (2019.01)

(52) U.S. Cl.
CPC ........ *H02P 29/0241* (2016.02); *B60L 3/0061* (2013.01); *B60L 50/64* (2019.02); *H02P 29/025* (2013.01)

(58) Field of Classification Search
CPC ........ G05B 19/416; G05B 2219/41319; G05D 3/20; G05D 13/62; H02P 23/14; H02P 29/0241; H02P 29/025; B60L 50/64; B60L 3/0061

USPC ......................................................... 318/139
See application file for complete search history.

(56) References Cited

U.S. PATENT DOCUMENTS

| | | | |
|---|---|---|---|
| 6,437,963 B1 * | 8/2002 | Hamilton | B05B 5/10 361/227 |
| 2013/0234504 A1 * | 9/2013 | Morita | B60R 16/03 307/9.1 |
| 2018/0001924 A1 * | 1/2018 | Imaizumi | B62D 5/0481 |
| 2018/0052434 A1 * | 2/2018 | Maekawa | G06F 13/14 |
| 2019/0160949 A1 * | 5/2019 | Inokuma | H02J 7/16 |
| 2021/0184456 A1 * | 6/2021 | Suzuki | B60L 3/00 |

* cited by examiner

*Primary Examiner* — Jorge L Carrasquillo
(74) *Attorney, Agent, or Firm* — Oliff PLC (57) ABSTRACT

A power source system includes: a rotary electrical machine; a power source; a switch that is provided between the power source and the rotary electrical machine; and a power source control device that controls opening/closing of the switch in response to a request for power feeding to the rotary electrical machine. The power source control device is configured to, in response to the power source system stopping operation, bring the switch into a closed state in a predetermined period of time. A rotary electrical machine control device controlling the rotary electrical machine includes: a determination unit that, in response to the power source system stopping operation, determines that the switch is in the closed state; and an abnormality diagnosis unit that, in response to the determination unit determining that the switch is in the closed state, performs an abnormality diagnosis of the rotary electrical machine.

4 Claims, 8 Drawing Sheets

ROTARY ELECTRICAL MACHINE CONTROL DEVICE AND CONTROL SYSTEM

CROSS-REFERENCE TO RELATED APPLICATION

The present application is a continuation application of International Application No. PCT/JP2018/012885, filed on Mar. 28, 2018, which claims priority to Japanese Patent Application No. 2017-088191 filed on Apr. 27, 2017, the entire content of which is incorporated herein by reference.

TECHNICAL FIELD

The present invention relates to a rotary electrical machine control device and a control system that perform an abnormality diagnosis of a rotary electrical machine.

BACKGROUND

An in-vehicle system mounted in a vehicle conventionally has a function to self-diagnose whether a power shutoff means provided for handling an abnormal state such as overvoltage is normally operating, for example, as described in WO 2016/181435. WO 2016/181435 describes that self-diagnosis is executed after the ignition switch is turned off to reduce processing at the time of starting. This makes it possible to activate the in-vehicle system quickly after the ignition switch is turned on.

SUMMARY

In a first aspect to solve the foregoing issue, a rotary electrical machine control device usable with a power source system that includes: a rotary electrical machine; a power source that supplies power to the rotary electrical machine; a switch that is provided between the power source and the rotary electrical machine; and a power source control device that controls opening/closing of the switch in response to a request for power feeding to the rotary electrical machine, and controls the rotary electrical machine. The power source control device is configured to, in response to the power source system stopping operation, bring the switch into a closed state in a predetermined period of time. The rotary electrical machine control device includes: a determination unit that, in response to the power source system stopping operation, determines that the switch is in the closed state; and an abnormality diagnosis unit that, in response to the determination unit determining that the switch is in the closed state, performs an abnormality diagnosis of the rotary electrical machine.

BRIEF DESCRIPTION OF THE DRAWINGS

The foregoing and other objects, features, and advantages of the present disclosure will be more clarified by the following detailed descriptions with reference to the accompanying drawings. The drawings are as follows.

DETAILED DESCRIPTION OF THE PREFERRED EMBODIMENTS

When the ignition switch is turned off, power may not be stably supplied to all the devices. For example, a rotary electrical machine is not assumed to be supplied power when the ignition switch is in the off state because, when the ignition switch is turned off, the rotary electrical machine does not need to be driven with power supply in principle. However, the rotary electrical machine performs self-diagnosis by current control based on stable power supply, and thus there is a problem in performing an abnormality diagnosis after the turn-off of the ignition switch.

The present disclosure has been devised in light of the foregoing circumstances. A main object of the present disclosure is to provide a rotary electrical machine control device and a control system that enable power feeding to a rotary electrical machine during an abnormality diagnosis of the rotary electrical machine.

In a first aspect to solve the foregoing issue, a rotary electrical machine control device usable with a power source system that includes: a rotary electrical machine; a power source that supplies power to the rotary electrical machine; a switch that is provided between the power source and the rotary electrical machine; and a power source control device that controls opening/closing of the switch in response to a request for power feeding to the rotary electrical machine, and controls the rotary electrical machine. The power source control device is configured to, in response to the power source system stopping operation, bring the switch into a closed state in a predetermined period of time. The rotary electrical machine control device includes: a determination unit that, in response to the power source system stopping operation, determines that the switch is in the closed state; and an abnormality diagnosis unit that, in response to the determination unit determining that the switch is in the closed state, performs an abnormality diagnosis of the rotary electrical machine.

In response to the power source system stopping operation, the power source control device brings the switch into the closed state in the predetermined period of time. In addition, in response to the power source system stopping operation, the abnormality diagnosis unit performs an abnormality diagnosis of the rotary electrical machine, provided that the determination unit determines that the switch is in the closed state. Accordingly, it is possible to stably supply power to the rotary electrical machine during the abnormality diagnosis of the rotary electrical machine, thereby to ensure reliable execution of the diagnosis.

In a second aspect, the determination unit determines that the switch is in the closed state based on a time elapsed after the stoppage of operation of the power source system.

It is determined whether the switch is in the closed state based on the time elapsed after the stoppage of operation of the power source system. Accordingly, the power source control device and the determination unit can perform independent controls.

In a third aspect, the determination unit determines that the switch is in the closed state after a lapse of a predetermined time according to a time necessary for the switch to make a transition to the closed state since the stoppage of operation of the power source system.

Thus, there is provided a window time for the switch to make a transition to the closed state. Accordingly, regardless of the open/closed state of the switch before the stoppage of operation of the power source system, it is possible to properly determine that the switch is actually in the closed state after the switch is set to the closed state.

In a fourth aspect, the determination unit determines that the switch is in the closed state based on control information input from the power source control device.

It is determined that the switch is in the closed state based on the control information. This makes it possible to properly determine the period of time required for an abnormality diagnosis with stable supply of power.

In a fifth aspect, a control system usable with a power source system that includes: a rotary electrical machine; a first storage battery and a second storage battery that are connected in parallel to the rotary electrical machine; a first switch that is provided in an electrical path connecting the first storage battery and the second storage battery on a side closer to the first storage battery than a connection point to the rotary electrical machine is; and a second switch that is provided in the electrical path on a side closer to the second storage battery than the connection point is. The control system includes: a power source control device that controls opening/closing of the first switch and opening/closing of the second switch in response to a request for power feeding to the rotary electrical machine; and a rotary electrical machine control device that controls the rotary electrical machine. The power source control device is configured to, in response to the power source system stopping operation, brings the first switch into the closed state and brings the second switch into the open state in a predetermined period of time. The rotary electrical machine control device has: a determination unit that, in response to the power source system stopping operation, determines that the first switch is in the closed state and the second switch is in the open state; and an abnormality diagnosis unit that, in response to the determination unit determining that the first switch is in the closed state and the second switch is in the open state, performs an abnormality diagnosis of the rotary electrical machine.

In response to the power source system stopping operation, the power source control device brings the first switch into the closed state and brings the second switch into the open state in the predetermined period of time. Then, in response to the power source system stopping operation, the abnormality diagnosis unit performs the abnormality diagnosis of the rotary electrical machine, provided that it is determined that the first switch is in the closed state. This makes it possible to stably supply power to the rotary electrical machine during the abnormality diagnosis of the rotary electrical machine to ensure reliable execution of the diagnosis. In addition, it is possible to supply power from the first storage battery, thereby achieving stable power supply as compared to the case of supplying power from either of the first storage battery and the second storage battery.

In a sixth aspect, the determination unit determines that the first switch is in the closed state and the second switch is in the open state based on a time elapsed after the stoppage of operation of the power source system.

It is determined that the first switch is in the closed state based on the time elapsed after the stoppage of operation of the power source system. Accordingly, the power source control device and the rotary electrical machine control device can perform independent controls.

In a seventh aspect, the determination unit determines that the first switch is in the closed state and the second switch is in the open state after a lapse of a predetermined time according to a time necessary for the first switch to make a transition to the closed state and for the second switch to make a transition to the open state since the stoppage of operation of the power source system.

Thus, there is provided a window time for the first switch to make a transition to the closed state. Accordingly, regardless of the open/closed states of the switches before the stoppage of operation of the power source system, it is possible to properly determine that the first switch is in the closed state after the switches made state transition.

In an eighth aspect, the power source control device is configured to output control information indicating that the first switch is in the closed state and the second switch is in the open state. The determination unit determines that the first switch is in the closed state and the second switch is in the open state based on the control information input from the power source control device.

The determination unit can properly determine that the first switch is in the closed state based on the control information.

In a ninth aspect, the power source control device brings the first switch and the second switch into the open state after execution of the abnormality diagnosis by the abnormality diagnosis unit.

After the abnormality diagnosis, the switches are brought into the open state, which makes it possible to prevent delivery of unnecessary power between the storage batteries and the rotary electrical machine, thereby preventing unintentional behavior.

In a tenth aspect, in response to the power source system stopping operation, after execution of the abnormality diagnosis by the abnormality diagnosis unit, the power source control device brings the first switch and the second switch into the open state and executes the abnormality diagnoses of the first switch and the second switch in that state.

It is possible to prevent power supply to the rotary electrical machine during the abnormality diagnoses of the switches, thereby preventing unintentional behavior.

In an eleventh aspect, the power source control device determines the presence or absence of an abnormality in charging and discharging of the second storage battery during the operation of the power source system. When determining that there is an abnormality, the power source control device controls the first switch into the closed state and the second switch into the open state as fail-safe processing such that conduction is enabled between the first storage battery and the rotary electrical machine via the first switch.

In the power source system, when it is determined that there is an abnormality in the charging and discharging of the second storage battery during the operation of the power source system, the first switch is controlled into the closed state and the second switch is controlled into the open state as fail-safe processing to enable conduction between the first storage battery and the rotary electrical machine via the first switch. In this case, even in a configuration without a normally-closed bypass relay connecting the first storage battery and the rotary electrical machine, for example, it is possible to properly perform fail-safe processing. In addition, in this configuration, no power feeding to the rotary electrical machine via the normally closed bypass relay can be expected after the stoppage of the system, but bringing the first switch into the closed state and bringing the second switch into the open state makes it possible to properly perform the abnormality diagnosis after the stoppage of the system.

Hereinafter, embodiments will be described. In the following embodiments, the identical or equivalent components will be given the same reference signs in the drawings and descriptions of the components with the same reference signs will be incorporated by reference. In the present embodiment, a rotary electrical machine control device and a control system used in a power source system 10 of a vehicle are embodied. The power source system 10 supplies power to various devices in the vehicle that runs with an engine 101 (internal combustion engine) as a drive source.

First Embodiment

Figure 1:
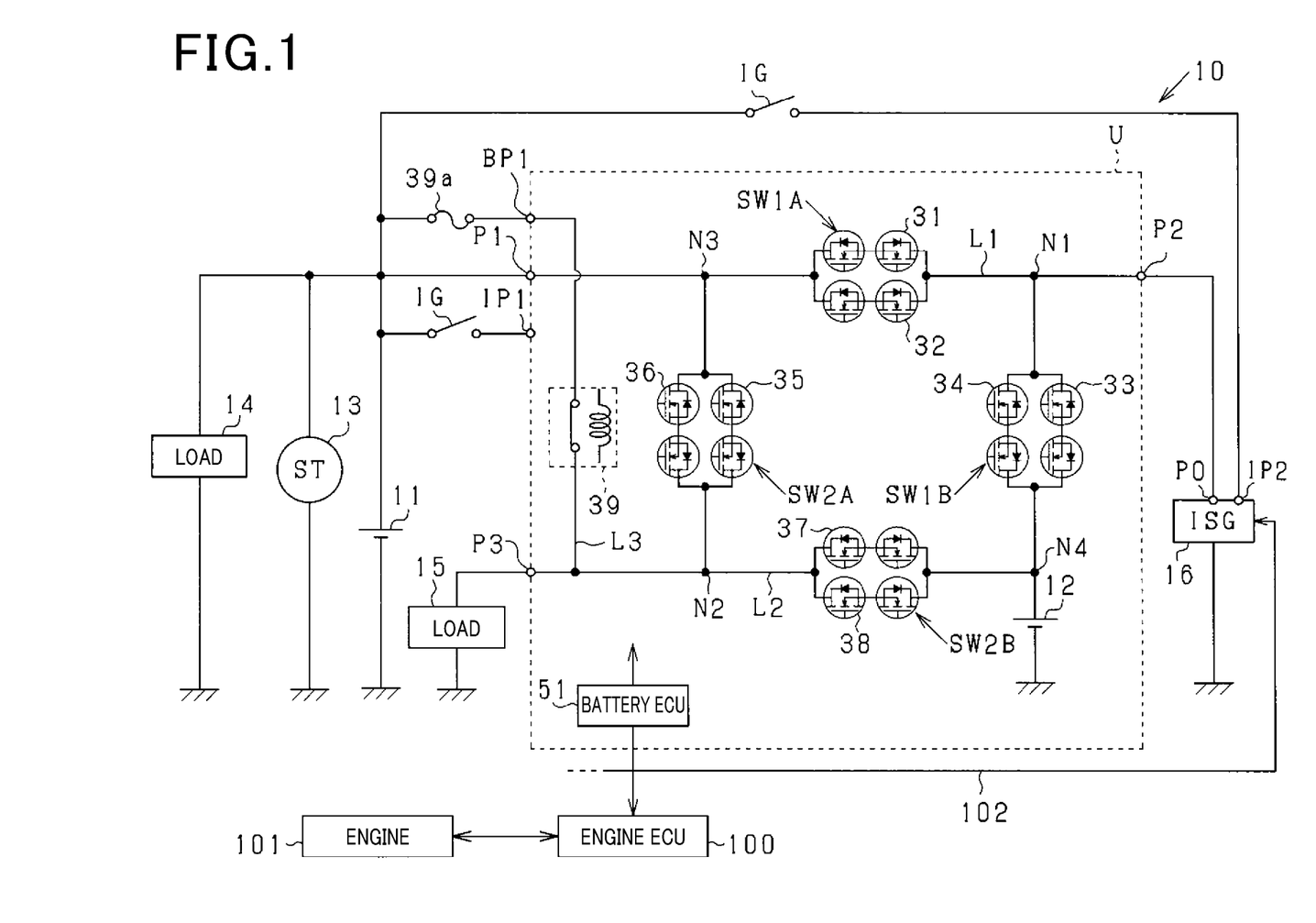
FIG. 1 is an electric circuit diagram illustrating a power source system.

As illustrated in FIG. 1, the power source system 10 has a two-power source system that has a lead storage battery 11 as a first storage battery (power source) and a lithium-ion storage battery 12 as a second storage battery. The storage batteries 11 and 12 can feed power to a starter 13, various electric loads 14, 15, and a rotary electrical machine unit 16 as a rotary electrical machine. The rotary electrical machine unit 16 can charge the storage batteries 11 and 12. In this system, the lead storage battery 11 and the lithium-ion storage battery 12 are connected in parallel to the rotary electrical machine unit 16, and the lead storage battery 11 and the lithium-ion storage battery 12 are connected in parallel to the electric loads 14 and 15.

Although not specifically described in the drawings, the lithium-ion storage battery 12 is stored in a storage case and is configured as a substrate-integrated battery unit U. The battery unit U has output terminals P1, P2, and P3. The lead storage battery 11, the starter 13, and the electric load 14 are connected to the output terminal P1, and a power source terminal P0 of the rotary electrical machine unit 16 is connected to the output terminal P2, and the electric load 15 is connected to the output terminal P3.

The electric loads 14 and 15 are different in requirement for the voltage of power supplied from the storage batteries 11 and 12. Between them, the electric loads 15 include constant voltage-required loads in which the voltage of supplied power is constant or stable with fluctuation at least in a predetermined range. In contrast to this, the electric load 14 is a general electric load other than the constant voltage-required load. The electric load 15 can also be said to be a protected load. The electric load 15 can also be said to be a load that is not allowed for a power failure, and the electric load 14 can be said to be a load that is allowed for a power failure.

Specific examples of the electric load 15 as a constant voltage-required load include various ECUs of navigation devices, audio devices, and meter devices. In this case, the fluctuation in the voltage of the supplied power is reduced to suppress the occurrence of unnecessary resetting of the foregoing devices, thereby achieving stable operations. The electric load 15 may include a running actuator for power steering device or brake device. Specific examples of the electric load 14 include a seat heater, a defroster heater for rear window, head lights, wipers on front window, an air fan for air-conditioner, and others.

Figure 2:
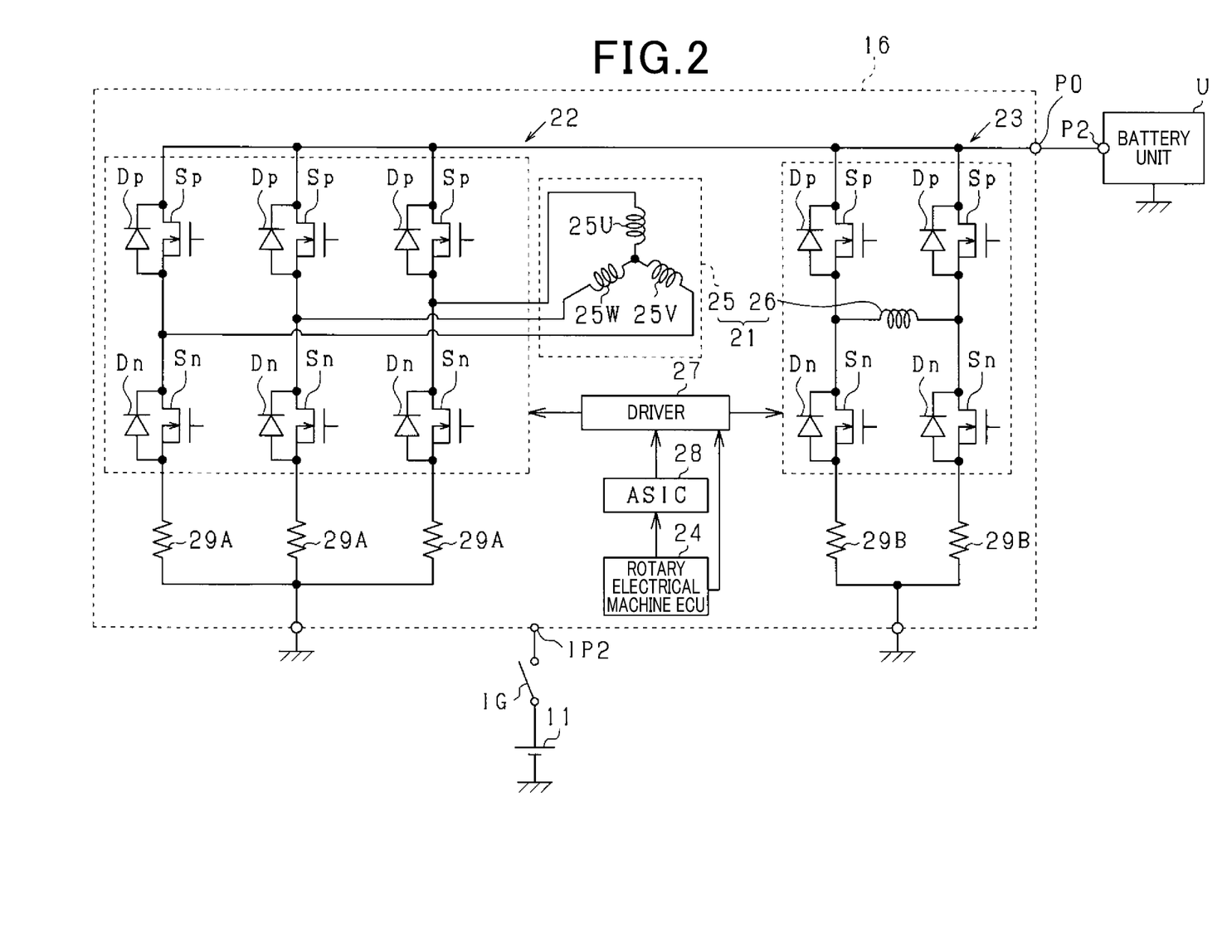
FIG. 2 is a circuit diagram illustrating an electrical configuration of a rotary electrical machine unit.

As illustrated in FIG. 2, the rotary electrical machine unit 16 includes a motor 21, an inverter 22, a field circuit 23, and a rotary electrical machine ECU 24 that controls operations of the motor 21. The rotary electrical machine unit 16 is a power generator with a motor function and is formed as a mechatronic integrated starter generator (ISG). The rotary electrical machine unit 16 will be described later in detail.

An electrical configuration of the battery unit U will be described with reference to FIG. 1. The battery unit U has a first electric path L1 connecting the output terminal P1 and lithium-ion the storage battery 12 as an in-unit electric path, and has the output terminal P2 connected to a connection point N1 as an intermediate point on the first electric path L1. In this case, the first electric path L1 is a path electrically connecting the lead storage battery 11 and the lithium-ion storage battery 12, and the rotary electrical machine unit 16 is connected to the connection point N1 on the first electric path L1. In the first electric path L1, a first A switch SW1A is provided as a first switch on a side nearer the lead storage battery 11 than the connection point N1 is, and a first B switch SW1B is provided as a second switch on a side nearer the lithium-ion storage battery 12 than the connection point N1 is. The first electric path L1 and the N1-P2 electric path constitute a large-current path in which an input/output current is to be flown into the rotary electrical machine unit 16. Through this path, the storage batteries 11, 12 and the rotary electrical machine unit 16 are mutually energized.

In the battery unit U, a second electric path L2 is provided in parallel to the first electric path L1, and the output terminal P3 is connected to a connection point N2 as an intermediate point in the second electric path L2. One end of the second electric path L2 is connected to a branch point N3 between the output terminal P1 and the first A switch SW1A on the first electric path L1, and the other end is connected to a branch point N4 between the first B switch SW1B and the lithium-ion storage battery 12 on the first electric path L1. In the second electric path L2, a second A switch SW2A is provided on a side nearer the lead storage battery 11 than the connection point N2 is, and a second B switch SW2B is provided on a side nearer the lithium-ion storage battery 12 than the connection point N2 is. The second electric path L2 and the N2-P3 electric path constitute a small-current path in which a small current is to be flown as compared to the first electric path L1 (that is, a small-current path with a smaller permissible current than that in the first electric path L1). Through this path, the electric load 15 is energized from the storage batteries 11 and 12.

In the operating state of the power source system 10, when the first A switch SW1A and the first B switch SW1B are selectively operated in the closed state, conduction is established between at least one of the lead storage battery 11 and the lithium-ion storage battery 12 and the rotary electrical machine unit 16 via the first electric path L1. In addition, when the second A switch SW2A and the second B switch SW2B are selectively operated in the closed state, conduction is established between at least one of the lead storage battery 11 and the lithium-ion storage battery 12 and the electric load 15 via the second electric path L2.

The switches SW1A, SW1B, SW2A, and SW2B are formed from semiconductor switching elements such as MOSFETs, in other words, normally-open switches. Specifically, the first A switch SW1A has a switch part 31 that is formed from semiconductor switching elements connected in series with parasitic diodes oriented in opposite directions and a switch part 32 that is formed from semiconductor switching elements connected in series with parasitic diodes oriented in opposite directions, and these switch parts 31 and 32 are connected in parallel. The other switches are configured in the same manner. Specifically, the first B switch SW1B is formed by connecting switch parts 33 and 34 in parallel, the second A switch SW2A is formed by connecting switch parts 35 and 36 in parallel, and the second B switch SW2B is formed by connecting switch parts 37 and 38 in parallel.

Each of the switch parts 31 to 38 has a pair of semiconductor switching elements with the parasitic diodes oriented in opposite directions. Thus, when the first A switch SW1A is turned off (opened), for example, that is, when each of the semiconductor switching elements is turned off, the flow of the current through the parasitic diodes is perfectly shut off. That is, it is possible to avoid unintentional flow of the current into the electric paths L1 and L2.

FIG. 1 illustrates the parasitic diodes connected by anodes to each other. Alternatively, the parasitic diodes may be connected by cathodes to each other. The semiconductor switching elements can be IGBTs, bipolar transistors, or the like, instead of the MOSFETs. In the case of using IGBTs or bipolar transistors, diodes in place of the parasitic diodes are connected in parallel to the semiconductor switching elements.

Figure 3:
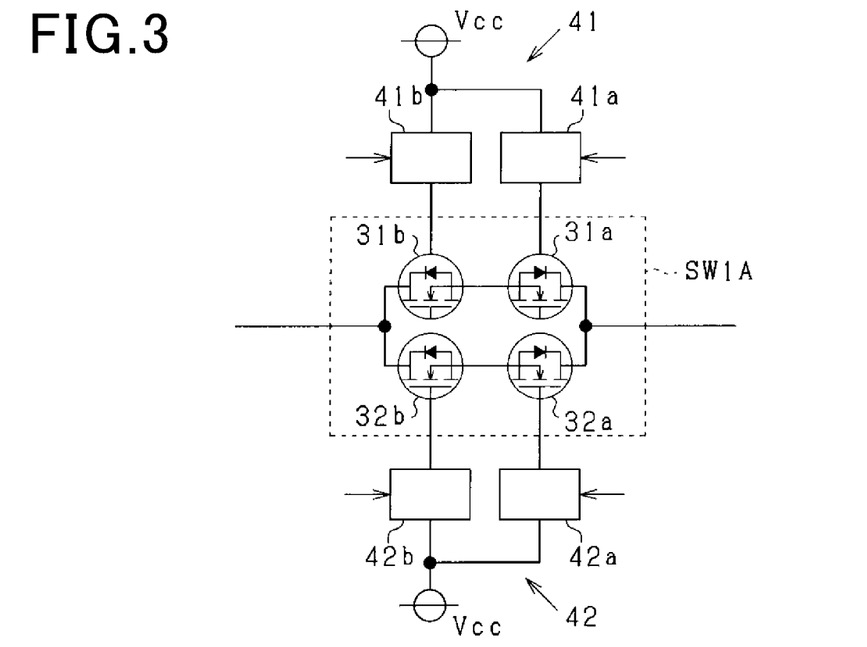
FIG. 3 is a circuit diagram illustrating a configuration of a drive unit for a first A switch.

A configuration of drive units of the switches SW1A, SW1B, SW2A, and SW2B will be described. FIG. 3 is a circuit diagram illustrating a configuration of the drive unit of the first A switch SW1A. The first A switch SW1A has switching elements 31a and 31b constituting the switch part 31 and switching elements 32a and 32b constituting the switch part 32. As a power source drive unit 41 to drive the switch part 31, drive circuits 41a and 41b are respectively provided for the switching elements 31a and 31b. As a power source drive unit 42 to drive the switch part 32, drive circuits 42a and 42b are respectively provided for the switching elements 32a and 32b. Command signals for opening and closing operations are input from a battery ECU 51 into the drive circuits 41a, 41b, 42a, and 42b. Based on the command signals, the drive circuits 41a, 41b, 42a, and 42b open or close the switching elements 31a, 31b, 32a, and 32b.

A power source voltage Vcc is supplied to each of the power source drive units 41 and 42. According to the foregoing configuration, the switch parts 31 and 32 in parallel to each other are driven by the individual power source drive units 41 and 42, which makes it possible to, even in the event of a power failure at one of the switch parts, open and close the other switch part. That is, the power feeding to the storage battery 11 by the power generation of the rotary electrical machine unit 16 and the power feeding from the storage battery 11 to the rotary electrical machine unit 16 can be reliably performed. Although not illustrated, the other switches SW1B, SW2A, and SW2B are configured in the same manner.

In addition, as illustrated in FIG. 1, the battery unit U is provided with a bypass path L3 linking a bypass terminal BP1 connected to the storage battery 11 and the output terminal P3. A bypass relay 39 is provided on the bypass path L3. That is, the bypass relay 39 is provided in parallel to the second A switch SW2A. The bypass relay 39 is a normally-closed mechanical relay switch. Closing the bypass relay 39 allows the lead storage battery 11 and the electric load 15 to be electrically connected even when the second A switch SW2A is off. For example, when the ignition switch IG as an activation switch of a vehicle described later is in the off state, the switches SW1A, SW1B, SW2A, and SW2B are off (opened). In such a state, dark current is supplied to the electric load 15 via the bypass relay 39. A fuse 39a is provided in a path between the lead storage battery 11 and the bypass terminal BP1.

Like the second electric path L2, the bypass path L3 is a small-current path with a smaller permissible current than that in the first electric path L1 is, and the fuse 39a is melt down by flowing an upper limit path current according to the permissible current. The bypass path L3 and the bypass relay 39 can be provided outside the battery unit U.

The battery unit U includes the battery ECU 51 as a power source control device that controls on and off (open and closed) states of the switches SW1A, SW1B, SW2A, and SW2B and the bypass relay 39. The battery ECU 51 is formed from a microcomputer including a CPU, a ROM, a RAM, an input/output interface, and others, and is mounted on the same substrate. The battery ECU 51 brings the bypass relay 39 into the open state while the ignition switch IG is in the on state, that is, the power source system 10 is in the operating state. In the operating state of the power source system 10, the battery ECU 51 switches the open/closed states of the switches SW1A, SW1B, SW2A, and SW2B based on the states of the storage batteries 11 and 12 and a request for power feeding to the electric load 15 or the rotary electrical machine unit 16.

The rotary electrical machine ECU 24 of the rotary electrical machine unit 16 and the battery ECU 51 of the battery unit U are connected to an engine ECU 100 as a host control device that integrally controls the ECUs 24 and 51. The engine ECU 100 is formed from a microcomputer including a CPU, a ROM, a RAM, an input/output interface, and others, and controls the operation of the engine 101 based on the engine operating state and the vehicle running state on each occasion. The ECUs 24, 51, and 100 are communicably connected together via a communication line 102 structuring a communication network such as a CAN to perform bi-directional communication in a predetermined cycle. Accordingly, various kinds of data is stored in common among the ECUs 24, 51, and 100.

The engine ECU 100 is a host control device over the rotary electrical machine ECU 24 and the battery ECU 51, and outputs various commands based on the charged states of the storage batteries 11 and 12, the operating state of the vehicle, and others. For example, the engine ECU 100 outputs to the battery ECU 51 commands for opening and closing control of the switches SW1A, SW1B, SW2A, and SW2B and the bypass relay 39. Accordingly, in the power source system 10, the lead storage battery 11 and the lithium-ion storage battery 12 are selectively used to perform charging and discharging. The engine ECU 100 also outputs to the rotary electrical machine ECU 24 commands relating to the power generation function and the power running function.

An external terminal IP1 of the battery unit U is connected to the lead storage battery 11 via the ignition switch IG. When the ignition switch IG is turned on (closed), the external terminal IP1 of the battery unit U receives an input of an IG on signal indicating that the ignition switch IG is turned on (that is, the power source system 10 is in the operating state) from the lead storage battery 11. That is, when the ignition switch IG is turned on, a terminal voltage of the lead storage battery 11 is input to the external terminal IP1.

On the other hand, when the ignition switch IG is turned off (opened), the external terminal IP1 of the battery unit U receives an input of an IG off signal indicating that the lead storage battery 11 is electrically disconnected and the ignition switch IG is turned off (that is, the power source system 10 is in the stopped state). That is, when the ignition switch IG is turned off, an input of the voltage from the lead storage battery 11 to the external terminal IP1 is stopped.

Similarly, an external terminal IP2 of the rotary electrical machine unit 16 is connected to the lead storage battery 11 via the ignition switch IG. When the ignition switch IG is turned on, the external terminal IP2 of the rotary electrical machine unit 16 receives from the storage battery 11 an input of an IG on signal indicating that the ignition switch IG is turned on. That is, when the ignition switch IG is turned on, the terminal voltage of the lead storage battery 11 is supplied to the external terminal IP2.

On the other hand, when the ignition switch IG is turned off, the external terminal IP2 of the rotary electrical machine unit 16 receives an input of an IG off signal indicating that the storage battery 11 is electrically disconnected and the ignition switch IG is turned off. That is, when the ignition switch IG is turned off, an input of the voltage from the lead storage battery 11 to the external terminal IP1 is stopped.

Next, an electrical configuration of the rotary electrical machine unit 16 will be described with reference to FIG. 2. A motor 21 is a three-phase alternating-current motor, which includes U-phase, V-phase, and W-phase windings 25U, 25V, and 25W as a three-phase armature winding 25, and a field winding 26. The rotary electrical machine unit 16 includes the power generation function to perform power generation (regenerative power generation) by rotation of the engine output shaft and the axle and the power running function to provide a rotational force to the engine output shaft. Specifically, the rotation shaft of the motor 21 is drivingly coupled by a belt to the engine output shaft not illustrated. The rotation shaft of the motor 21 rotates via the belt along with the rotation of the engine output shaft to generate power, and the engine output shaft rotates along with the rotation of the rotation shaft of the motor 21 to provide a rotational force to the engine output shaft.

An inverter 22 converts alternating-current voltages output from the phase windings 25U, 25V, and 25W into direct-current voltages (power generation voltages) and outputs the same to the battery unit U via a power source terminal P0. The inverter 22 also converts a direct-current voltage (power source voltage) input from the battery unit U via the power source terminal P0 into an alternating-current voltage and outputs it to the field windings 25U, 25V, and 25W. The inverter 22 is a bridge circuit having the same number of upper and lower arms as the number of the phase windings and constitutes a three-phase full-wave rectifier circuit. The inverter 22 constitutes a drive circuit that drives the motor 21 while adjusting power to be supplied to the motor 21.

The inverter 22 includes an upper arm switch Sp and a lower arm switch Sn for each phase. In the present embodiment, the switches Sp and Sn are voltage-controlled semiconductor switching elements, specifically, N-channel MOSFETs. The upper arm switch Sp is connected to an upper arm diode Dp in reverse parallel, and the lower arm switch Sn is connected to a lower arm diode Dn in reverse parallel. In the present embodiment, the diodes Dp and Dn are body diodes of the switches Sp and Sn. The diodes Dp and Dn are not limited to the body diodes but may be diodes separated from the switches Sp and Sn, for example. An intermediate connection point in the series-connection body of the switches Sp and Sn in each phase is connected to one end of the phase winding 25U, 25V, or 25W.

The field circuit 23 is a bi-directional switch that can apply a direct-current voltage to the field winding 26. In the present embodiment, the field circuit 23 constitutes an H bridge rectifier circuit with a combination of four switches Sp and Sn. The basic configuration of the switches Sp and Sn is the same as that of the switches of the inverter 22, and thus descriptions thereof will be omitted here. In the present embodiment, the direct-current voltage to be applied to the field winding 26 is adjusted by switching control of the switches Sp and Sn to control the direction and amount of the field current to be supplied to the field winding 26.

The switches Sp and Sn constituting the inverter 22 and the field circuit 23 are independently switched between on/off drive via a driver 27. This system is provided with a current detection unit 29A to detect phase currents iu, iv, and iw and a current detection unit 29B to detect a field current if. The current detection units 29A and 29B include a current transformer and a resistor, for example.

The rotary electrical machine ECU 24 as a rotary electrical machine control device is formed from a microcomputer including a CPU, a ROM, a RAM, an input/output interface, and others. The rotary electrical machine ECU 24 adjusts a field current to be supplied to the field winding 26 to control the power generation voltage of the rotary electrical machine unit 16 (the output voltage to the battery unit U). After the start of running of the vehicle, the rotary electrical machine ECU 24 controls the inverter 22 to drive the motor 21, thereby assisting the driving force of the engine 101.

Next, fail-safe processing performed by the rotary electrical machine ECU 24 and the battery ECU 51 will be described. In the present embodiment, the rotary electrical machine ECU 24 and the battery ECU 51 correspond to a control system 200. The rotary electrical machine ECU 24 has a fail-safe function to perform safe control of the motor 21 in the event of an abnormality being detected in the rotary electrical machine unit 16 or the battery unit U. The battery ECU 51 has a fail-safe function to perform safe control of the battery unit U in the event of an abnormality being detected in the rotary electrical machine unit 16 or the battery unit U.

Examples of an abnormality in the rotary electrical machine unit 16 or the battery unit U include an abnormal voltage such as a decrease or increase in the power source voltage as the terminal voltage of the storage battery 12 connected to the motor 21, an abnormally high temperature of the storage battery 12, and others.

As fail-safe processing in the rotary electrical machine unit 16 against the occurrence of an abnormality, the rotary electrical machine unit 16 limits the operation of the motor 21. In the present embodiment, as a limitation of the operation of the motor 21, the rotary electrical machine unit 16 performs a process of turning off the switches Sp and Sn of the inverter 22 and the field circuit 23 and interrupting a current to the motor 21. As fail-safe processing in the battery unit U, the battery ECU 51 performs a switching control to bring the first A switch SW1A and the bypass relay 39 into the closed state, and bringing the first B switch SW1B, the second A switch SW2A, and the second B switch SW2B into the open state.

The detection of an abnormality in the power source voltage is performed by an ASIC 28 mounted in the rotary electrical machine unit 16. For example, while the power source system 10 is in the operating state, in the case of performing power running driving in response to a command from the engine ECU 100, when the power source voltage input into the ASIC 28 via the power source terminal P0 is equal to or lower than a threshold voltage, the ASIC 28 detects an abnormality and performs fail-safe processing. When it is determined that the power source voltage is normal, the ASIC 28 performs a normal switching control in response to a torque command from the engine ECU 100.

An abnormality in the battery unit U such as an abnormally high temperature is detected by the battery ECU 51. The battery ECU 51 outputs an abnormality signal indicating the occurrence of an abnormality to other ECUs, that is, the rotary electrical machine ECU 24 and the engine ECU 100 via a communication line 102. The rotary electrical machine ECU 24 performs fail-safe processing based on the result of detection of a voltage abnormality by the ASIC 28 and the abnormality signal received from the battery ECU 51.

In the present embodiment, when the ignition switch IG is turned off, that is, when the power source system 10 stops operation, it is determined that an abnormality has occurred with the need to perform fail-safe processing, and a false abnormality signal is output from the ASIC 28. Then, based on the false abnormality signal, an abnormality diagnosis is performed to determine whether the fail-safe function is normally activated. That is, when the vehicle system is in the normal state, an abnormality with the need to perform fail-safe processing is virtually produced, and an abnormality diagnosis (activation checking) is performed to determine whether the fail-safe function is normally activated in the virtually abnormal situation.

The abnormality diagnosis process relating to an abnormality diagnosis (activation checking) on whether the fail-safe function is normally activated will be described with reference to the flowchart illustrated in FIG. 4. This process is executed by the rotary electrical machine ECU 24 when the ignition switch IG is turned off and the IG off signal is input into the external terminal IP2. That is, this process is executed by the rotary electrical machine ECU 24 when the power source system 10 is in the operation stop state. More specifically, the process is executed in step S22 of a rotary electrical machine-side termination process described later.

In step S101, the rotary electrical machine ECU 24 outputs a command for performing an activation checking current control to the driver 27. In this case, between the stator side and the field side, the rotary electrical machine ECU 24 first selects the field side as a diagnosis target (activation checking target), and supplies an activation checking current to the field winding 26. Then, the rotary electrical machine ECU 24 proceeds to step S102.

In step S102, the rotary electrical machine ECU 24 determines whether the activation checking current is flowing based on current detection values from the current detection units 29A and 29B. When the current detection values are equal to or greater than a predetermined value, the rotary electrical machine ECU 24 determines that the activation checking current is flowing (step S102: YES). In this case, when determining that there is no abnormality, the rotary electrical machine ECU 24 proceeds to step S103.

On the other hand, when a current value equal to or greater than a predetermined value is not observed regardless of the flowing of the activation checking current, the rotary electrical machine ECU 24 determines that the activation checking current is not flowing (step S102: NO). In this case, that is, when determining that there is an abnormality, the rotary electrical machine ECU 24 proceeds to step S106.

In step S103, the rotary electrical machine ECU 24 causes the ASIC 28 to output a false abnormality signal to the driver 27. For example, the rotary electrical machine ECU 24 causes the ASIC 28 to output a false abnormality signal to the driver 27 by intentionally reducing the power source voltage to be input to the ASIC 28. Then, the rotary electrical machine ECU 24 proceeds to step S104.

In step S104, the rotary electrical machine ECU 24 determines whether current interrupt is being performed based on the current detection values form the current detection units 29A and 29B. For example, when the diagnosis target is the field side, the rotary electrical machine ECU 24 compares the current detection value of the field current if detected by the current detection unit 29B with a threshold. When the current detection value is equal to or lower than the threshold, the rotary electrical machine ECU 24 determines that the current interrupt is being performed normally and the fail-safe function is activated normally. When determining that the current interrupt is being performed normally (step S104: YES), that is, when determining that there is no abnormality, the rotary electrical machine ECU 24 proceeds to step S105.

On the other hand, when the current detection value is not equal to or lower than the threshold, the rotary electrical machine ECU 24 determines that the current interrupt is not being performed normally and the fail-safe function has not been activated normally. When not determining that the current interrupt is being performed normally (step S104: NO), that is, when determining that there is an abnormality, the rotary electrical machine ECU 24 proceeds to step S106.

In step S105, the rotary electrical machine ECU 24 determines whether all diagnosis patterns of abnormality diagnosis for abnormal reduction in the power source voltage have been completed. Between the field side and the stator side, when an abnormality diagnosis (activation checking) has not yet been performed on the stator side, the rotary electrical machine ECU 24 makes a negative determination in step S105, and performs again steps S101 to S105 on the stator side. When an abnormality diagnosis has been completed on the field side and the stator side, the rotary electrical machine ECU 24 makes a positive determination in step S105 and terminates the process.

In step S106, the rotary electrical machine ECU 24 performs a process according to an abnormality in the rotary electrical machine unit 16. For example, the rotary electrical machine ECU 24 may store the fact that there is an abnormality in the storage unit, and may store a signal indicating the presence of the abnormality to the engine ECU 100 and the battery ECU 51. The rotary electrical machine unit 16 may perform the fail-safe processing and the current to the motor 21 may be interrupted. Alternatively, the rotary electrical machine unit 16 may notify the driver of the presence of the abnormality. In addition, the rotary electrical machine unit 16 may perform these in combination.

In the abnormality diagnosis process, the abnormality diagnosis (activation checking) of the field side is sequentially performed in each of the phases, without particular limitation on the order of execution. The activation checking current is controlled to flow into the electrical path of the activation checking target, and the switch on the electrical path into which the activation checking current has been supplied is turned off at the time of the abnormality diagnosis. The abnormality diagnosis of the stator side is also sequentially performed in the U, V, and W phases, without particular limitation on the order of execution. The activation checking current is controlled to flow into the field winding of the diagnosis target, and the switch connected to the phase winding into which the activation checking current has been supplied is turned off at the time of the abnormality diagnosis (activation checking).

The activation checking current is a microcurrent for checking whether the current interrupt is being performed normally. At the time of an abnormality diagnosis, the abnormality diagnosis is separately performed on the stator side and the field side. Therefore, either of the stator side and the field side is selected as a diagnosis target, and the activation checking current is supplied to the selected diagnosis target. This prevents the generation of torque from the motor 21.

When the ignition switch IG is turned off, it is not necessary to drive the rotary electrical machine unit 16 or feed power to the rotary electrical machine unit 16 because power generation is not possible and there is no need to provide a rotational force (driving force). Accordingly, in the battery unit U, when the ignition switch IG is in the off state, that is, when the power source system 10 is in the operation stop state, the switches SW1A, SW1B, SW2A, and SW2B are brought into the open state and the bypass relay 39 is brought into the closed state as a principle.

However, in the abnormality diagnosis process, as described above, the current control is performed to supply the activation checking current, and the abnormality diagnosis is performed depending on whether the activation checking current is interrupted. Accordingly, at the time of execution of the abnormality diagnosis process, it is necessary to stably supply power to the rotary electrical machine unit 16.

Thus, when the power source system 10 stops operation, the battery ECU 51 brings the first A switch SW1A into the closed state and brings the first B switch SW1B into the open state in a predetermined period. In the case where the power source system 10 stops operation, the rotary electrical machine ECU 24 performs the abnormality diagnosis process when determining that the first A switch SW1A is in the closed state. Hereinafter, this process will be described below in detail.

Figure 5:
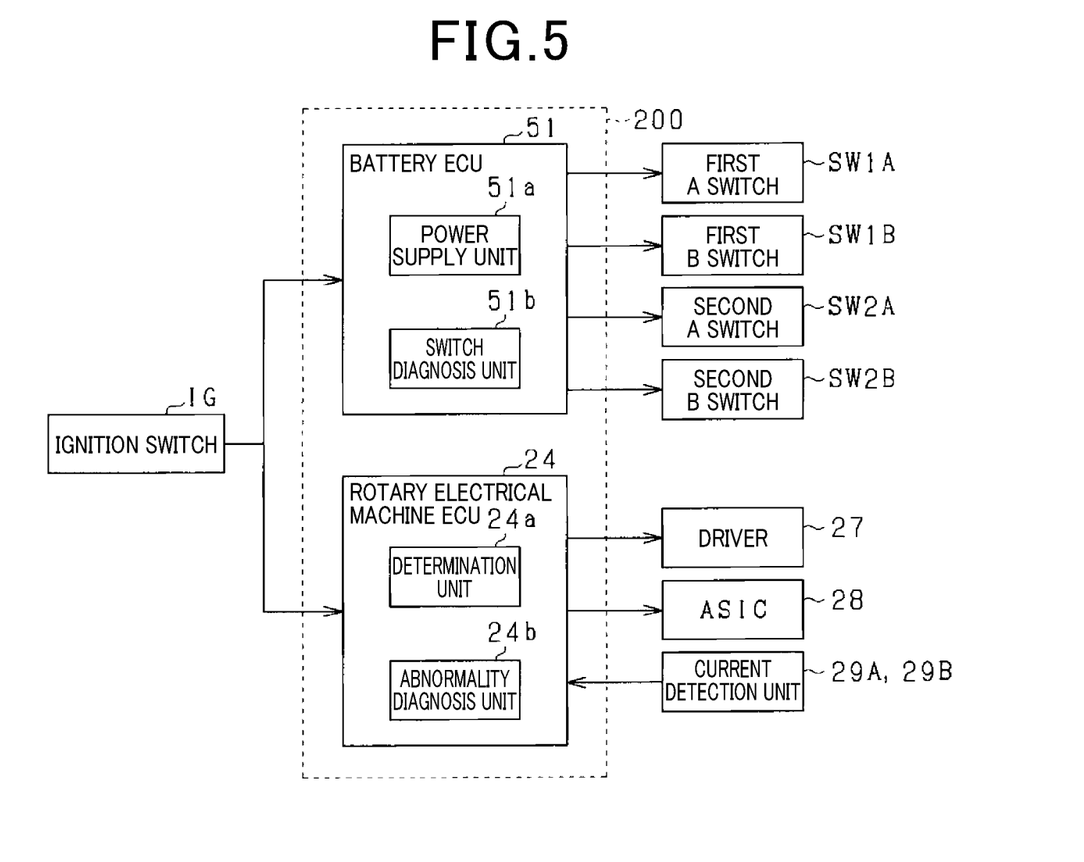
FIG. 5 is a block diagram of a control system.

As illustrated in FIG. 5, a control system 200 to perform the abnormality diagnosis process of the rotary electrical machine unit 16 includes the battery ECU 51 and the rotary electrical machine ECU 24. The battery ECU 51 performs the functions of a power supply unit 51a and a switch diagnosis unit 51b. These functions are implemented by executing programs stored in the storage unit of the battery ECU 51. These functions may be implemented by an electronic circuit as hardware or may be at least partially implemented by software, that is, by processes executed on a computer.

When the ignition switch IG is turned off and the power source system 10 stops operation, the power supply unit 51a brings the first A switch SW1A into the closed state and brings the first B switch SW1B into the open state in a predetermined period. After the abnormality diagnosis process is performed by the rotary electrical machine ECU 24, the power supply unit 51a brings the first A switch SW1A and the first B switch SW1B into the open state. After the abnormality diagnosis process is performed by the rotary electrical machine ECU 24 and the switches SW1A, SW1B, SW2A, and SW2B are brought into the open state, the switch diagnosis unit 51b performs an abnormality diagnosis of the switches SW1A, SW1B, SW2A, and SW2B in that state.

The rotary electrical machine ECU 24 performs functions of a determination unit 24a and an abnormality diagnosis unit 24b. These functions are implemented by executing programs stored in the storage unit of the rotary electrical machine ECU 24. These functions may be implemented by an electronic circuit as hardware or may be at least partially implemented by software, that is, by processes executed on a computer.

When the ignition switch IG is turned off and the power source system 10 stops operation, the determination unit 24a determines whether the first A switch SW1A is in the closed state and the first B switch SW1B is in the open state. More specifically, the determination unit 24a determines whether the first A switch SW1A is in the closed state and the first B switch SW1B is in the open state based on a time elapsed after the stoppage of operation of the power source system 10. In this case, after a lapse of a time necessary from the stoppage of operation of the power source system 10 to the state transition of the first A switch SW1A and the first B switch SW1B, the determination unit 24a determines whether the first A switch SW1A is in the closed state and the first B switch SW1B is in the open state.

When the determination unit 24a determines that the first A switch SW1A is in the closed state and the first B switch SW1B is in the open state, the abnormality diagnosis unit 24b uses the driver 27, the ASIC 28, and the current detection units 29A and 29B to perform the abnormality diagnosis process as described above.

Figure 6:
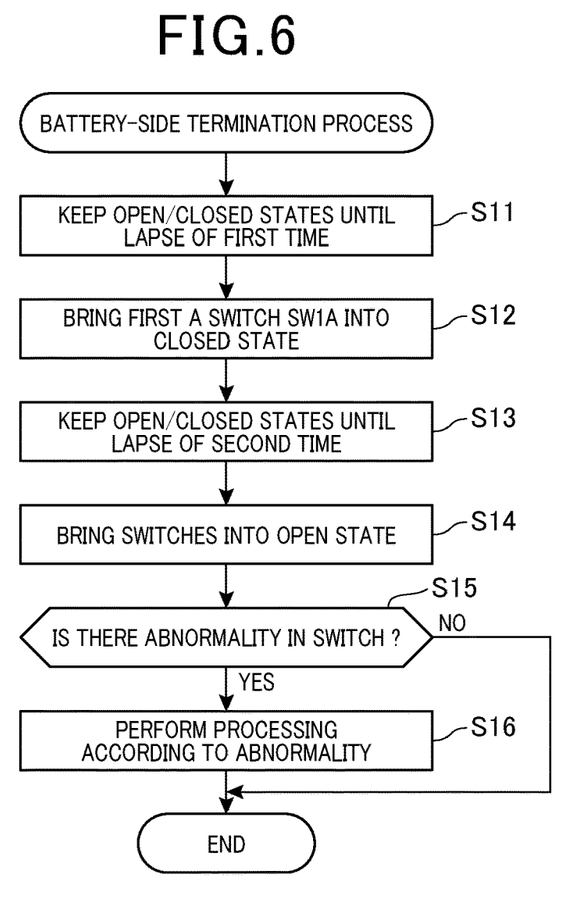
FIG. 6 is a flowchart of a battery-side termination process.

A battery-side termination process by the battery ECU 51 will be described with reference to FIG. 6. The battery-side termination process is executed when the ignition switch IG is turned off and the IG off signal is input. Specifically, the battery-side termination process is executed when the input voltage from the storage battery 11 to the external terminal IP1 of the battery unit U is lowered and the power source system 10 enters the operation stop state.

In step S11, the battery ECU 51 keeps the present open/closed states of the switches SW1A, SW1B, SW2A, and SW2B (maintains the present states) until a lapse of a first time (for example, 300 msec) since the turn-off of the ignition switch IG. Then, after the lapse of the first time, the battery ECU 51 proceeds to step S12.

In step S12, the battery ECU 51 brings the first A switch SW1A into the closed state and brings the first B switch SW1B into the open state. The battery ECU 51 brings the second A switch SW2A and the second B switch SW2B into the closed state once, and then brings the second A switch SW2A into the open state. On the other hand, the battery ECU 51 keeps the second B switch SW2B in the closed state and supplies dark current from the lithium-ion storage battery 12 to the electric load 15. Instead of the second A switch SW2A, the battery ECU 51 may bring the second B switch SW2B into the open state. In addition, the battery ECU 51 may bring the bypass relay 39 into the closed state and brings the second A switch SW2A and the second B switch SW2B into the open state. Then, the battery ECU 51 proceeds to step S13.

In step S13, after the move to step S13, the battery ECU 51 keeps the open/closed states of the switches SW1A, SW1B, SW2A, and SW2B until a lapse of a second time (for example, 1500 msec). The second time corresponds to a time necessary for the rotary electrical machine ECU 24 to perform the abnormality diagnosis process, which is set to be longer than maximum time necessary for the abnormality diagnosis process (for example, 1000 msec), for example.

The second time is set such that the time from the turn-off of the ignition switch IG to the lapse of the second time is longer than the time from the turn-off of the ignition switch IG to the termination of the abnormality diagnosis process. That is, the first to third times are set such that the total sum of the first time, the second time, and the time necessary for step S12 is longer than the total sum of the third time from the turn-off of the ignition switch IG to the start of the abnormality diagnosis process and the time necessary for the abnormality diagnosis process.

Accordingly, the battery ECU 51 keeps the first A switch SW1A in the closed state in a predetermined period from the move to step S13 after the operation stoppage of the power source system 10 to the lapse of the second time. In steps S12 and S13, the battery ECU 51 serves as the power supply unit 51*a*. After the lapse of the second time, the battery ECU 51 proceeds to step S14.

In step S14, the battery ECU 51 brings the bypass relay 39 into the closed state and brings the switches SW1A, SW1B, SW2A, and SW2B into the open state. Then, the battery ECU 51 proceeds to step S15.

In step S15, the battery ECU 51 diagnoses the presence or absence of an abnormality in the switches SW1A, SW1B, SW2A, and SW2B. For example, when the divided partial voltage is found to be equal to or greater than a predetermined value based on the voltage of the intermediate point between the switching elements 31*a* and 31*b* constituting the switch part 31 of the first A switch SW1A, the battery ECU 51 determines that either of the switching elements 31*a* and 31*b* is abnormal (on failure of non-entering into the open state). On the other hand, when the partial voltage is not equal to or greater than a predetermined value, the battery ECU 51 determines that the switching elements 31*a* and 31*b* are normal. This diagnosis is also applied to the other switch parts 32 to 38.

Since power can be always supplied to the battery unit U from the storage battery 11 or the lithium-ion storage battery 12, the switches SW1A, SW1B, SW2A, and SW2B do not need to be brought into the closed state at the time of the diagnosis. In step S15, the battery ECU 51 serves as the switch diagnosis unit 51*b*.

When determining that there is an abnormality in step S15 (step S15: YES), the battery ECU 51 proceeds to step S16, and when determining that there is no abnormality (step S15: NO), the battery ECU 51 terminates the battery-side termination process. At the end of the battery-side termination process, the battery ECU 51 shifts to a sleep state until the ignition switch IG is turned on.

In step S16, the battery ECU 51 performs a process depending on the abnormality in the battery unit U. For example, the battery ECU 51 may store the fact that there is the abnormality in the storage unit or may output a signal indicating the presence of the abnormality to the engine ECU 100 and the rotary electrical machine ECU 24. In addition, the battery ECU 51 may perform fail-safe processing relating to the battery unit U, or may cause the driver to notify the presence of the abnormality, or may perform both of them.

During the battery-side termination process, the battery ECU 51 may shut down the communication network to terminate the communication with the outside at an arbitrary timing. In this case, when it is determined that there is an abnormality and there is the need for communication, the battery ECU 51 can resume the communication network at that time.

Figure 7:
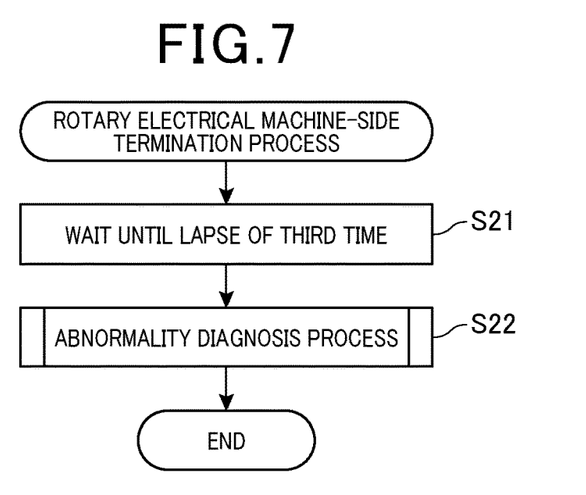
FIG. 7 is a flowchart of a rotary electrical machine-side termination process.

A rotary electrical machine-side termination process by the rotary electrical machine ECU 24 will be described with reference to FIG. 7. The rotary electrical machine-side termination process is executed when the ignition switch IG is turned off and the IG off signal is input. That is, the rotary electrical machine-side termination process is executed when the input voltage from the storage battery 11 to the external terminal IP2 of the rotary electrical machine unit 16 is lowered and the power source system 10 enters the operation stop state.

In step S21, the rotary electrical machine ECU 24 waits for a lapse of the predetermined third time (for example, 700 msec) since the turn-off of the ignition switch IG. The third time is the total sum of the first time (300 msec) in step S11 and the time necessary for state transition of the switches SW1A, SW1B, SW2A, and SW2B. The time necessary for the state transition corresponds to the time necessary for the switches SW1A, SW1B, SW2A, and SW2B to make a transition to predetermined open/closed states (the time necessary for performing step S12). For example, the third time is set to be longer than the maximum time (for example, 250 msec) necessary for performing step S12. After the lapse of the third time, the rotary electrical machine ECU 24 determines that the first A switch SW1A is in the closed state and the first B switch SW1B is in the open state, and proceeds to step S22. In step S21, the rotary electrical machine ECU 24 serves as the determination unit 24*a*.

Figure 4:
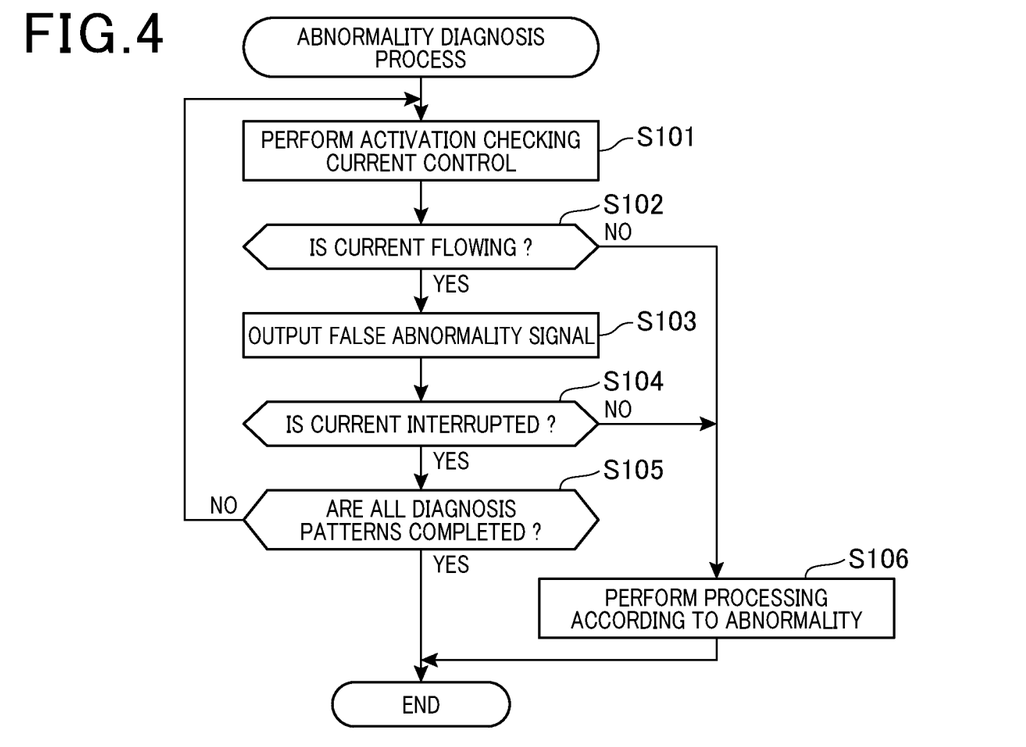
FIG. 4 is a flowchart of an abnormality diagnosis process.

In step S22, the rotary electrical machine ECU 24 performs the abnormality diagnosis process illustrated in FIG. 4. In step S22, the rotary electrical machine ECU 24 serves as the abnormality diagnosis unit 24*b*. After the completion of the abnormality diagnosis process, the rotary electrical machine ECU 24 terminates the rotary electrical machine-side termination process. At the completion of the rotary electrical machine-side termination process, the rotary electrical machine ECU 24 shifts to a sleep state until the ignition switch IG is turned on.

During the battery-side termination process, the battery ECU 51 may shut down the communication network to terminate the communication with the outside at an arbitrary timing. In this case, when it is determined that there is an abnormality and there is the need for communication, the battery ECU 51 can resume the communication network at that time.

Figure 8:
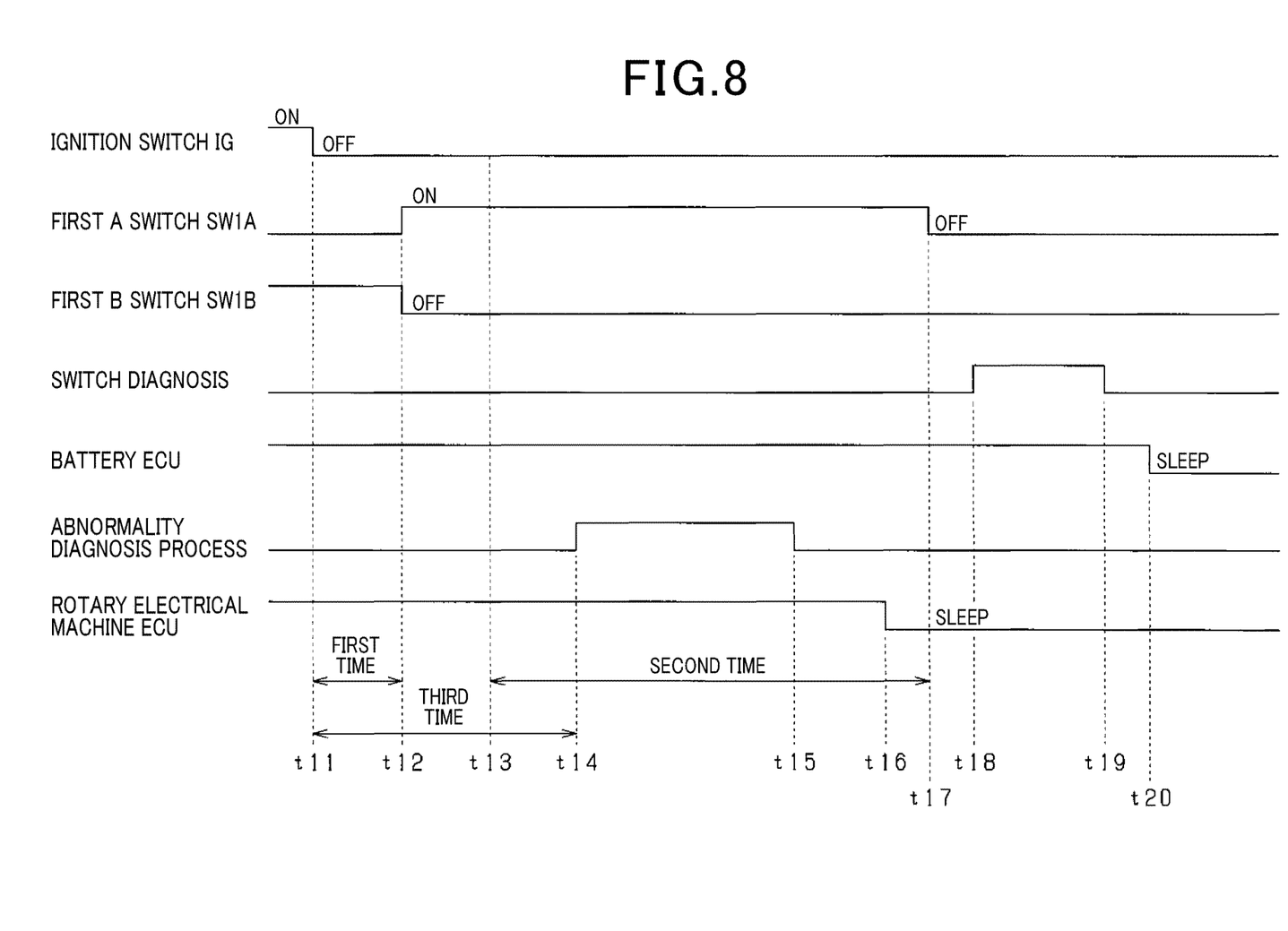
FIG. 8 is a time chart illustrating execution timings.

Next, execution timings for the various processes by the battery ECU 51 and the rotary electrical machine ECU 24 will be described with reference to a time chart illustrated in FIG. 8.

When the ignition switch IG is turned off (time point t11), the battery ECU 51 keeps the present open/closed states of the switches SW1A, SW1B, SW2A, and SW2B until the lapse of the first time. Referring to FIG. 8, when the ignition switch is off, the first A switch SW1A is off (open state) and the first B switch SW1B is on (closed state). In addition, the rotary electrical machine ECU 24 waits for the lapse of the third time, that is, until the first A switch SW1A absolutely enters the closed state.

When the first time has elapsed since the turn-off of the ignition switch IG (time point t12), the battery ECU 51 brings the first A switch SW1A into the closed state and brings the first B switch SW1B into the open state.

The time until the first A switch SW1A is brought into the closed state and the first B switch SW1B is brought into the open state varies depending on the open/closed states of the switches when the ignition switch IG is off. However, at least until the lapse of the third time (time point t13), the first A switch SW1A is brought into the closed state and the first B switch SW1B is brought into the open state. Then, the battery ECU 51 keeps the open/closed states of the switches SW1A, SW1B, SW2A, and SW2B until the lapse of the second time.

When the third time has elapsed since the turn-off of the ignition switch IG (time point t14), the rotary electrical machine ECU 24 performs the abnormality diagnosis process. Upon completion of the abnormality diagnosis process (time point t15), the rotary electrical machine ECU 24 shifts to a sleep state (time point t16).

Upon a lapse of the second time (time point t17), at least the abnormality diagnosis process has been terminated.

Accordingly, the battery ECU 51 brings the bypass relay 39 into the closed state and brings the switches SW1A, SW1B, SW2A, and SW2B into the open state. After that (time point t18), the battery ECU 51 diagnoses the switches SW1A, SW1B, SW2A, and SW2B. Upon completion of diagnosis of the switches SW1A, SW1B, SW2A, and SW2B (time point t19), the battery ECU 51 shifts to a sleep state (time point t20).

As above, the time from the turn-off of the ignition switch IG to the lapse of the second time (time point t11 to time point t17) is set to be longer than the time from the turn-off of the ignition switch IG to the completion of the abnormality diagnosis process (time point t11 to time point t15). In addition, during the second time (time point t13 to time point t17), the abnormality diagnosis process (time point t14 to time point t15) is executed.

According to the foregoing configuration, the following excellent advantageous effects can be produced.

When the power source system 10 stops operation, the battery ECU 51 brings the first A switch SW1A into the closed state in a predetermined period. More specifically, the battery ECU 51 brings the first A switch SW1A into the closed state and brings the first B switch SW1B into the open state. In the case where the power source system 10 stops operation, the rotary electrical machine ECU 24 performs an abnormality diagnosis of the rotary electrical machine unit 16 when determining that the first A switch SW1A is in the closed state. This makes it possible to stably supply power to the rotary electrical machine unit 16 during the abnormality diagnosis of the rotary electrical machine unit 16, thereby ensuring reliable diagnosis.

In addition, it is possible to stably supply power from the lead storage battery 11 as compared to the case where it is not decided from which of the storage batteries 11 and 12 to feed power. That is, it is possible to fix the electrical path through which to supply power, and it is possible to stably supply power from the fixed power source. This improves the accuracy of the abnormality diagnosis.

The rotary electrical machine ECU 24 determines that the first A switch SW1A is in the closed state base on the time lapsed after the stoppage of operation of the power source system 10. Accordingly, the battery ECU 51 and the rotary electrical machine ECU 24 can independently perform controls.

The rotary electrical machine ECU 24 determines that the first A switch SW1A is in the closed state after the lapse of the third time corresponding to the time necessary from the stoppage of operation of the power source system 10 to the state transition of the switches SW1A, SW1B, SW2A, and SW2B. This provides a window time for the state transition of the switches SW1A, SW1B, SW2A, and SW2B. Accordingly, regardless of the open/closed states of the switches SW1A, SW1B, SW2A, and SW2B before the stoppage of operation of the power source system 10, after the first A switch SW1A has entered the closed state, the rotary electrical machine ECU 24 can properly determine that the first A switch SW1A is in the closed state.

The battery ECU 51 brings the switches SW1A, SW1B, SW2A, and SW2B into the open state after the abnormality diagnosis process. This makes it possible to prevent unnecessary delivery of power between the storage batteries 11, 12 and the rotary electrical machine unit 16 during the stoppage of operation of the power source system 10, thereby preventing the occurrence of unintentional behavior.

The battery ECU 51 performs a diagnosis of the switches SW1A, SW1B, SW2A, and SW2B after bringing the switches SW1A, SW1B, SW2A, and SW2B into the open state. This makes it possible to prevent power supply to the rotary electrical machine unit 16 during the abnormality diagnosis of the switches SW1A, SW1B, SW2A, and SW2B that would result in the occurrence of unintentional behavior.

During the abnormality diagnosis, the rotary electrical machine ECU 24 performs a current control so as not to generate torque. This makes it possible to prevent the occurrence of unintentional behavior during the stoppage of operation of the power source system 10.

Second Embodiment

A second embodiment is different from the first embodiment in that processing is performed based on control information input and output between a battery ECU 51 and a rotary electrical machine ECU 24. Hereinafter, the second embodiment will be described in detail, focusing on differences from the first embodiment.

When bringing a first A switch SW1A into the closed state, a power supply unit 51a in the second embodiment outputs control information indicating that effect. Upon receipt of an input of control information indicating completion of the abnormality diagnosis process, the power supply unit 51a determines that the abnormality diagnosis process has been performed by the rotary electrical machine ECU 24, and brings the first A switch SW1A and a first B switch SW1B into the open state.

Upon receipt of an input of the control information indicating that the first A switch SW1A is in the closed state, a determination unit 24a in the second embodiment determines that the first A switch SW1A in the closed state based on the control information. After execution of the abnormality diagnosis process, an abnormality diagnosis unit 24b outputs control information indicating completion of the abnormality diagnosis process.

Figure 9:
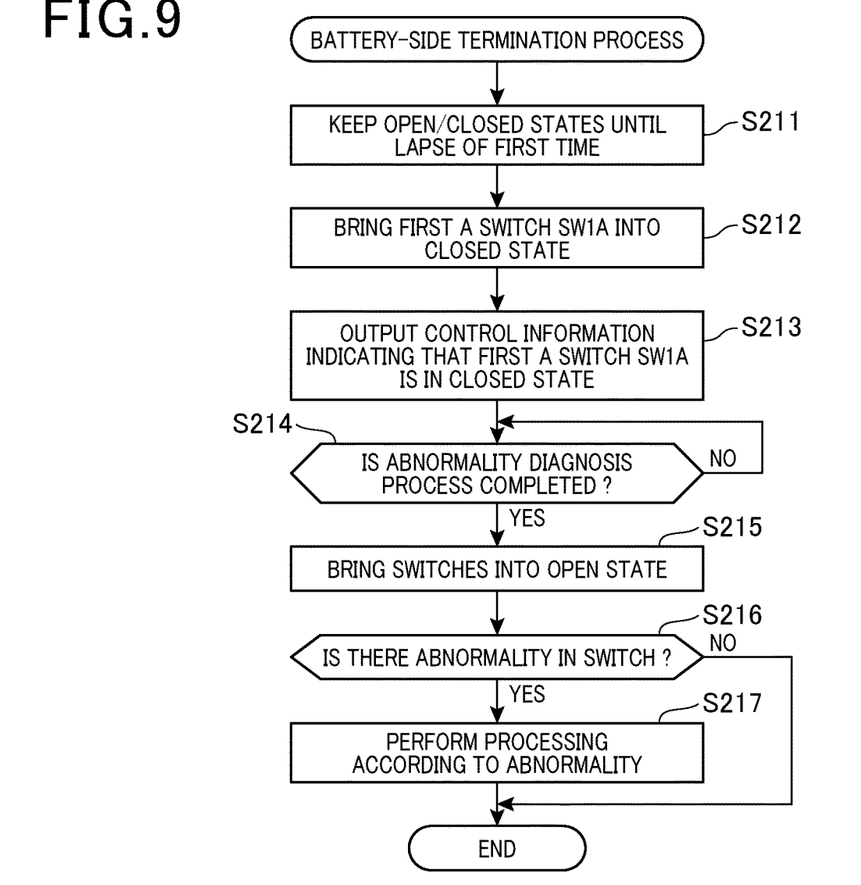
FIG. 9 is a flowchart of a battery-side termination process in a second embodiment.

A battery-side termination process in the second embodiment will be described with reference to FIG. 9.

In step S211, the battery ECU 51 keeps the present open/closed states of the switches SW1A, SW1B, SW2A, and SW2B until a lapse of a first time since the turn-off of the ignition switch IG. Then, after the lapse of the first time, the battery ECU 51 shifts to step S212.

In step S212, the battery ECU 51 brings the first A switch SW1A into the closed state and brings the first B switch SW1B into the open state. The battery ECU 51 also brings the second A switch SW2A and the second B switch SW2B into the closed state once, and then brings the second A switch SW2A into the open state. Then, the battery ECU 51 proceeds to step S213.

In step S213, the battery ECU 51 outputs control information indicating that the first A switch SW1A is in the closed state to the rotary electrical machine ECU 24 via a communication line 102, and then proceeds to step S214.

In step S214, the battery ECU 51 determines whether there is an input of control information indicating completion of the abnormality diagnosis process from the rotary electrical machine ECU 24. When not determining that there is an input of the control information (step S214: NO), the battery ECU 51 waits for a predetermined time while keeping the open/closed states of the switches SW1A, SW1B, SW2A, and SW2B. Then, after a lapse of the predetermined time, the battery ECU 51 performs step S214 again.

On the other hand, when determining that there is an input of the control information (step S214: YES), the battery ECU 51 proceeds to step S215.

In step S215, the battery ECU 51 brings the bypass relay 39 into the closed state and brings the switches SW1A, SW1B, SW2A, and SW2B into the open state. Then, the battery ECU 51 proceeds to step S216.

In step S216, the battery ECU 51 diagnoses the presence or absence of an abnormality in the switches SW1A, SW1B, SW2A, and SW2B. When determining in step S216 that there is an abnormality (step S216: YES), the battery ECU 51 proceeds to step S217. When not determining in step S216 that there is an abnormality (step S216: NO), the battery ECU 51 terminates the battery-side termination process. Upon completion of the battery-side termination process, the battery ECU 51 enters and stays in a sleep state until the ignition switch IG is turned on. In step S217, the battery ECU 51 performs processing according to the abnormality in the battery unit U.

During the battery-side termination process, the battery ECU 51 needs to keep the communication network at least until the move to step S215 (until an input of the control information). After that, however, the battery ECU 51 may shut down the communication network at an arbitrary timing to terminate the communication with the outside.

Figure 10:
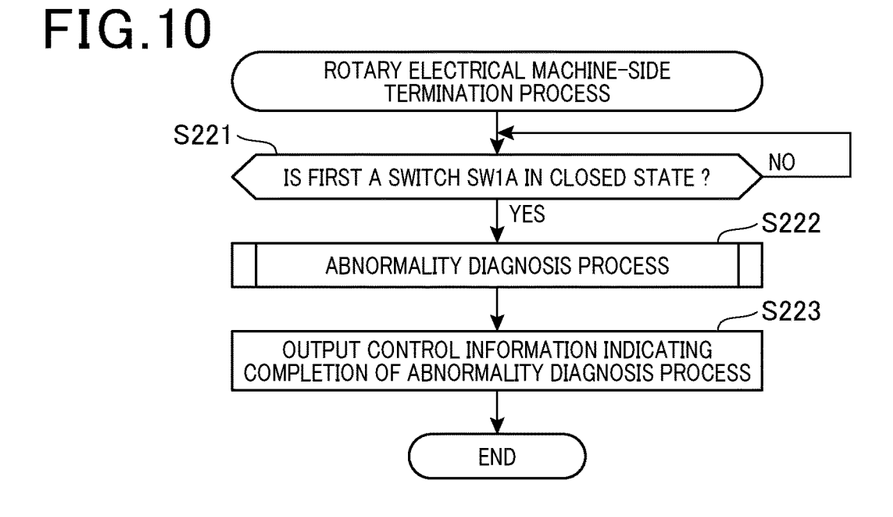
FIG. 10 is a flowchart of a rotary electrical machine-side termination process in the second embodiment.

A rotary electrical machine-side termination process in the second embodiment will be described with reference to FIG. 10.

In step S221, the rotary electrical machine ECU 24 determines whether there is an input of control information indicating that the first A switch SW1A is in the closed state. When making a negative determination (step S221: NO), the rotary electrical machine ECU 24 waits for a predetermined time and then executes again step S221. That is, the rotary electrical machine ECU 24 waits from the input of the IG off signal to the input of the control information indicating that the first A switch SW1A is in the closed state. On the other hand, when there is an input of the control information indicating that the first A switch SW1A is in the closed state, the rotary electrical machine ECU 24 proceeds to step S222.

In step S222, the rotary electrical machine ECU 24 performs the abnormality diagnosis process illustrated in FIG. 4. After completion of the abnormality diagnosis process, the rotary electrical machine ECU 24 proceeds to step S223.

In step S223, the rotary electrical machine ECU 24 outputs the control information indicating the completion of the abnormality diagnosis process to the battery ECU 51 via the communication line 102, and then exits the rotary electrical machine-side termination process. Upon completion of the rotary electrical machine-side termination process, the rotary electrical machine ECU 24 enters and stays in a sleep state until the ignition switch IG is turned on.

During the rotary electrical machine-side termination process, the battery ECU 51 needs to keep the communication network at least until the output of the control information. After that, however, the battery ECU 51 may shut down the communication network at an arbitrary timing to terminate the communication with the outside.

Figure 11:
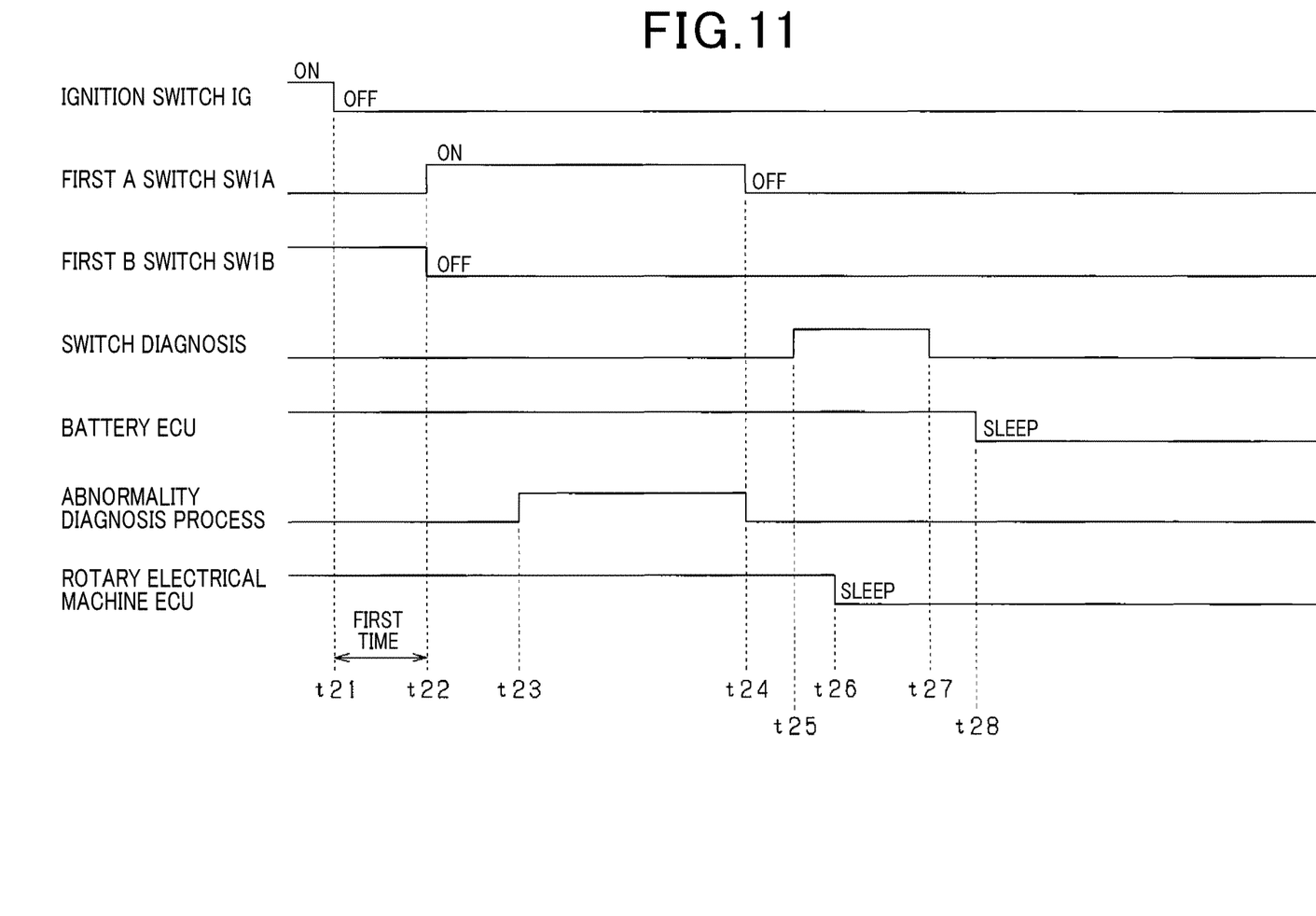
FIG. 11 is a time chart illustrating execution timings in the second embodiment.

Next, execution timings in the second embodiment will be described with reference to the time chart illustrated in FIG. 11.

When the ignition switch IG is turned off (time point t21), the battery ECU 51 keeps the present open/closed states of the switches SW1A, SW1B, SW2A, and SW2B until a lapse of the first time. Referring to FIG. 11, with the ignition switch IG in the off state, the first A switch SW1A is off (open state) and the first B switch SW1B is on (closed state). The rotary electrical machine ECU 24 waits until there is an input of control information indicating that the first A switch SW1A is in the closed state.

When the first time has elapsed until the turn-off of the ignition switch IG (time point t22), the battery ECU 51 performs a switching control to bring the first A switch SW1A into the closed state.

Upon completion of the switching control of bringing the first A switch SW1A into the closed state (time point t23), the battery ECU 51 outputs the control information indicating that the first A switch SW1A is in the closed state to the rotary electrical machine ECU 24. After that, the battery ECU 51 keeps the open/closed states of the switches SW1A, SW1B, SW2A, and SW2B until there is an input of control information indicating completion of the abnormality diagnosis process.

Upon receipt of an input of the control information indicating that the first A switch SW1A is in the closed state from the battery ECU 51 (time point t23), the rotary electrical machine ECU 24 performs the abnormality diagnosis process. Then, upon completion of the abnormality diagnosis process (time point t24), the rotary electrical machine ECU 24 outputs the control information indicating completion of the abnormality diagnosis process, and moves to a sleep state (time point t26).

Upon receipt of the control information indicating the completion of the abnormality diagnosis process (time point t24), the battery ECU 51 then brings the bypass relay 39 into the closed state and brings the switches SW1A, SW1B, SW2A, and SW2B into the open state at a predetermined timing. In that state, the battery ECU 51 diagnoses the switches SW1A, SW1B, SW2A, and SW2B (time point t25). Upon completion of the diagnosis of the switches SW1A, SW1B, SW2A, and SW2B (time point t27), the battery ECU 51 then shifts to a sleep state (time point t28).

As above, the abnormality diagnosis process is performed when the first A switch SW1A is in the closed state and the first B switch SW1B is in the open state.

According to the foregoing configuration, the following advantageous effects can be produced.

The rotary electrical machine ECU 24 determines that the first A switch SW1A is in the closed state based on the control information. Accordingly, the rotary electrical machine ECU 24 can properly determine the predetermined period suited for the abnormality diagnosis with stable power supply. In addition, the rotary electrical machine ECU 24 can determine the various timings based on the control information, which eliminates the need to provide an unnecessary waiting time and shortens the time until the completion of the abnormality diagnosis.

Other Embodiments

The present disclosure is not limited to the foregoing embodiments but may be carried out in manners described below, for example. In the following description, the identical or equivalent components in the following embodiments will be given the same reference signs and descriptions of the components with the same reference signs will be incorporated by reference.

The power source system 10 is a two-power source system including the lead storage battery 11 and the lithium-ion storage battery 12 but may be a system including only either one of them.

The battery ECU 51 performs a diagnosis of the switches SW1A, SW1B, SW2A, and SW2B after the completion of the abnormality diagnosis process but the diagnosis may be omitted.

The battery ECU 51 keeps the present open/closed states until the lapse of the first time since the stoppage of operation of the power source system 10. Alternatively, the battery ECU 51 may not keep the states but may bring the first A switch SW1A into the closed state.

The engine ECU 100 may notify the on/off state of the ignition switch IG to the battery unit U and the rotary electrical machine unit 16.

The present disclosure has been described so far according to the embodiments, but it is noted that the present disclosure is not limited to the foregoing embodiments or structures. The present disclosure includes various modifications and changes in a range of equivalency. In addition, various combinations and modes, and other combinations and modes including only one element of the foregoing combinations and modes, less or more than the one element are included in the scope and conceptual range of the present disclosure.

What is claimed is:

1. A rotary electrical machine control device usable with a power source system including: a rotary electrical machine; a power source that supplies power to the rotary electrical machine; a switch that is provided between the power source and the rotary electrical machine; and a power source control device that controls opening/closing of the switch in response to a request for power feeding to the rotary electrical machine, and that controls the rotary electrical machine, wherein the power source control device is configured to, in response to the power source system stopping operation, bring the switch into a closed state in a predetermined period of time, and the rotary electrical machine control device comprising:

a determination unit that, in response to the power source system stopping operation, determines that the switch is in the closed state; and an abnormality diagnosis unit that, in response to the determination unit determining that the switch is in the closed state, performs an abnormality diagnosis of the rotary electrical machine.

2. The rotary electrical machine control device according to claim 1, wherein the determination unit determines that the switch is in the closed state based on a time elapsed after the stoppage of operation of the power source system.

3. The rotary electrical machine control device according to claim 2, wherein the determination unit determines that the switch is in the closed state after a lapse of a predetermined time according to a time necessary for the switch to make a transition to the closed state since the stoppage of operation of the power source system.

4. The rotary electrical machine control device according to claim 1, wherein the determination unit determines that the switch is in the closed state based on control information input from the power source control device.

* * * * *